(12) United States Patent
Park et al.

(10) Patent No.: US 9,392,541 B2
(45) Date of Patent: Jul. 12, 2016

(54) METHOD AND DEVICE FOR M2M COMMUNICATION

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 14/113,885

(22) PCT Filed: May 2, 2012

(86) PCT No.: PCT/KR2012/003407
§ 371 (c)(1),
(2), (4) Date: Oct. 25, 2013

(87) PCT Pub. No.: WO2012/150797
PCT Pub. Date: Nov. 8, 2012

(65) Prior Publication Data
US 2014/0044034 A1    Feb. 13, 2014

Related U.S. Application Data

(60) Provisional application No. 61/481,248, filed on May 2, 2011.

(51) Int. Cl.
*H04W 4/06* (2009.01)
*H04W 4/08* (2009.01)
(Continued)

(52) U.S. Cl.
CPC .......... *H04W 52/0209* (2013.01); *H04W 60/00* (2013.01); *H04W 68/02* (2013.01)

(58) Field of Classification Search
CPC ..... H04W 64/00; H04W 4/005; H04W 48/12; H04W 52/0216; H04W 60/04; H04W 60/00; H04W 60/06
USPC ............... 370/328, 338, 310, 432; 455/422.1, 455/432.1, 435.1, 440
See application file for complete search history.

(56) References Cited

U.S. PATENT DOCUMENTS 7,346,361 B2 * 3/2008 Kang .................. H04W 52/287
370/338
7,894,831 B2 * 2/2011 Ryu ...................... H04W 60/00
370/331

(Continued)

FOREIGN PATENT DOCUMENTS

WO    2011-006768 A1    1/2011

OTHER PUBLICATIONS

IEEE 802.16P-11/0019, "Device ID and Group ID for M2M Devices", ETRI, Mar. 6, 2011 See pp. 2,4, 6-9, 14.

(Continued)

*Primary Examiner* — Wutchung Chu
(74) *Attorney, Agent, or Firm* — Dentons US LLP

(57) ABSTRACT

Provided are a method and device for M2M (Machine To Machine) communication. A M2M device receives a DSA (dynamic service addition) message from a base station, and the DSA message includes an MGID (M2M Group identifier) related to an M2M multicast service. The M2M device receives a paging advertisement (PAG-ADV) message from the base station in an idle mode, and the PAG-ADV message includes the MGID and an action code directing a location update performance. The M2M device transmits a ranging request (RNG-REQ) from the base station to perform a location update.

9 Claims, 4 Drawing Sheets

(51) Int. Cl.
*H04W 52/02* (2009.01)
*H04W 60/00* (2009.01)
*H04W 68/02* (2009.01)

(56) References Cited

U.S. PATENT DOCUMENTS

| | | | | |
|---|---|---|---|---|
| 7,986,633 | B2* | 7/2011 | Ryu | H04L 1/0003 370/252 |
| 8,532,671 | B2* | 9/2013 | Park et al. | 455/456.1 |
| 2006/0239265 | A1* | 10/2006 | Son | H04W 76/002 370/390 |
| 2007/0115891 | A1* | 5/2007 | Kim | 370/332 |
| 2007/0249347 | A1* | 10/2007 | Saifullah | H04W 36/38 455/436 |
| 2008/0095092 | A1* | 4/2008 | Kim | H04W 52/287 370/311 |
| 2009/0046637 | A1* | 2/2009 | Kim et al. | 370/329 |
| 2009/0080351 | A1* | 3/2009 | Ryu et al. | 370/312 |
| 2009/0186594 | A1* | 7/2009 | Kang | H04W 4/22 455/404.1 |
| 2009/0227265 | A1* | 9/2009 | Kang et al. | 455/456.1 |
| 2009/0323634 | A1* | 12/2009 | Kim | H04W 52/287 370/331 |
| 2010/0167756 | A1* | 7/2010 | Park et al. | 455/456.1 |
| 2010/0172325 | A1* | 7/2010 | Jung | H04W 36/0072 370/331 |
| 2011/0064016 | A1* | 3/2011 | Kim | H04L 12/189 370/312 |
| 2011/0149825 | A1* | 6/2011 | Lavi | H04W 36/0072 370/312 |
| 2011/0238834 | A1* | 9/2011 | Nair | H04W 36/0033 709/225 |
| 2011/0292856 | A1* | 12/2011 | Park | H04W 68/00 370/311 |
| 2012/0224522 | A1* | 9/2012 | Kim | H04W 4/06 370/312 |
| 2012/0257556 | A1* | 10/2012 | Jung | H04W 4/005 370/311 |
| 2012/0287839 | A1* | 11/2012 | Kim | H04W 72/005 370/312 |
| 2013/0005342 | A1* | 1/2013 | Cho et al. | 455/438 |
| 2013/0051296 | A1* | 2/2013 | Park et al. | 370/311 |
| 2014/0031063 | A1* | 1/2014 | Park | H04W 4/005 455/456.1 |

OTHER PUBLICATIONS

IEEE C802.16p-11/0018r1, "Proposed text for network reentry procedure of fixed M2M device", LG Electronics, Mar. 13, 2011 See pp. 3, 5 and figure 1.

IEEE 802.16p-11/0055, "IEEE 802.16p Machine to Machine (M2M): Proposed text on M2M Group Identifier", Samsung Electronics, Mar. 16, 2011 See pp. 2-3 and figure 2.

* cited by examiner

METHOD AND DEVICE FOR M2M COMMUNICATION

This application is a 35 USC §371 National Stage entry of International Application No. PCT/KR2012/003407 filed on May 2, 2012, and claims priority to U.S. Provisional Application No. 61/481,248 filed on May 2, 2011, each of which is hereby incorporated by reference in its entirety.

BACKGROUND OF THE INVENTION

1. Field of the invention

The present invention relates to a wireless communication, and more particularly, to a method and device for a machine to machine (M2M) communication in a wireless communication system.

2. Related Art

A machine to machine (M2M) communication is a form of a data communication including one or more entities which do not need a human interaction, and is also called a machine type communication (MTC). That is, the M2M communication is a concept that a machine device other than a terminal used by a person performs communication using a conventional wireless communication network. The machine device used in the M2M communication may be called an M2M device, and some examples of the M2M device are a vending machine and a machine which measures the water level of a dam.

The characteristics of the M2M device are different from those of a general terminal, and thus a service, which is optimized for the M2M communication, may be different from a service which is optimized for a human-to-human communication. When the M2M communication is compared with the current mobile network communication service, the M2M communication is characterized by different market scenarios, data communication low costs and efforts, potentially a large number of M2M devices, a large service area, and a low traffic per M2M device.

One of requirements of the M2M device is a low power consumption. In a mobile communication network, an idle mode, which is a lower power mode, is provided to reduce power consumption of a terminal. However, the conventional idle mode operation may not be optimized for the M2M device.

SUMMARY OF THE INVENTION

The present invention provides a method and device for a machine-to-machine (M2M) communication which may be paged in group units.

In an aspect, a method for machine-to-machine (M2M) communication includes receiving, by a M2M device, a dynamic service addition (DSA) message from a base station, the DSA message including a M2M Group identifier (MGID) associated with a M2M multicast service, entering, by the M2M device, an idle mode, receiving, by the M2M device in the idle mode, a paging advertisement (PAG-ADV) message from the base station, the PAG-ADV message including the MGID and an action code indicating to perform location update, and transmitting, by the M2M device, a ranging request (RNG-REQ) to the base station in order to perform location update.

The method may further include receiving, by the M2M device, a ranging response (RNG-RSP) from the base station as a response to the RNG-REQ, the RNG-RSP including the MGID and a new MGID.

In another aspect, a device for machine-to-machine (M2M) communication includes a radio frequency unit configured to transmit a radio signal, and a processor operably coupled with the radio frequency unit. The processor is configured to receive a dynamic service addition (DSA) message from a base station, the DSA message including a M2M Group identifier (MGID) associated with a M2M multicast service, enter an idle mode, receive a paging advertisement (PAG-ADV) message from the base station, the PAG-ADV message including the MGID and an action code indicating to perform location update, and instruct the radio frequency unit to transmit a ranging request (RNG-REQ) to the base station in order to perform location update.

In still another aspect, a base station for machine-to-machine (M2M) communication includes a radio frequency unit configured to transmit a radio signal, and a processor operably coupled with the radio frequency unit. The processor is configured to instruct the radio frequency unit to transmit a dynamic service addition (DSA) message to a M2M device, the DSA message including a M2M Group identifier (MGID) associated with a M2M multicast service, instruct the radio frequency unit to transmit a paging advertisement (PAG-ADV) message to the M2M device, the PAG-ADV message including the MGID and an action code indicating to perform location update, and receive a ranging request (RNG-REQ) from the M2M device in order to perform location update.

In the M2M communication, paging is possible in M2M group identifier (MGID) units. Further, a new MGID may be allocated while performing a location update. Further, a signaling burden due to a location update may be reduced, and power of the M2M device may be saved.

DESCRIPTION OF EXEMPLARY EMBODIMENTS

Below, formats of various messages are provided as a table. However, the name of a field of each table, the number of bits of the field, and the description on the field are merely an example, and may be easily changed by those of ordinary skill in the art. Further, not all suggested fields are essential. Some fields may be omitted in the message, or some arbitrary fields may be added.

Figure 1:
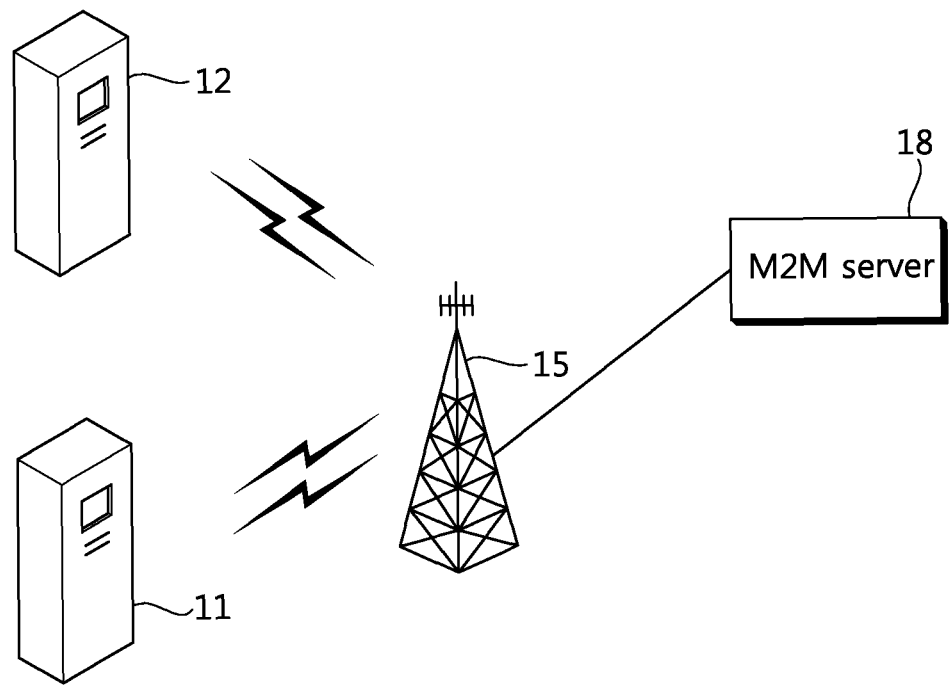
FIG. 1 is a diagram illustrating an example of a machine-to-machine (M2M) communication.

FIG. 1 is a diagram illustrating an example of a machine-to-machine (M2M) communication.

The M2M communication refers to information exchange between M2M devices 11 and 12 through a base station 15 which does not accompany a human interaction, or information exchange between the M2M device and an M2M server 18 through a base station.

The M2M server 18 is an entity which communicates with the M2M device 11. The M2M server 18 executes an M2M application, and provides an M2M-specific service to the M2M device 11.

The M2M device 11 is a wireless device which provides an M2M communication, and may be fixed or mobile.

The service, which is provided through the M2M communication, is distinguished from a service in a conventional communication which is intervened by a person, and there are services of various ranges such as tracking, metering, payment, a medical service, and remote control.

A representative example of individual service requirements of M2M features is described below.

1) Time controlled feature: According to this feature, an M2M device transmits and receives data only in a predefined section. Hence, unnecessary signaling outside a predefined section may be prevented.

2) Time tolerant feature: According to this feature, an M2M device may delay data transmission. When a network load is greater than a predetermined load threshold, a network operator may limit the M2M device's connection to a network or data transmission to another MTC device, and dynamically limit the amount of data which may be transmitted by the MTC device in a specific area.

3) Offline indication feature: According to this feature, when signaling between an M2M device and a network is not possible any more, a notice is requested to the M2M device an appropriate time point.

4) Priority alarm message (PAM) feature: According to this feature, when an M2M device is stolen or vandalized or any other emergency occurs, a warning notice is first given the network.

Arrangement of hundreds of or thousands of M2M devices in one cell (or base station) is being considered. Hence, it is difficult to identify the M2M device based on only the existing terminal identifier, and thus the following identifiers are being considered.

Station identifier (STID): The STID is an identifier which identifies the M2M device in the domain of the base station. The base station may allocate the same STID to a plurality of M2M devices.

M2M group identifier (MGID): The MGID is a 12 bit identifier which is used in uniquely identifying a multicast service flow which is shared by a group of an M2M device within an M2M group zone. The M2M group zone is a logic area including one or more base stations. The M2M group area is identified by an M2M group area index. The MGID is allocated in the dynamic service addition (DSA) process. Unless a network is disconnected or a service flow is deleted, the M2M device maintains the MGID even at an idle mode.

Fixed M2M deregistration identifier (FMDID): The FMDID is a 16 bit identifier which is used in uniquely identifying the M2M device in the area of the base station. The FMDID is allocated to the M2M device during an idle mode entry, and is released while the M2M device reenters the network.

Hereinafter, a location update in an IEEE 802.16-based system will be described with reference to section 16.2.18.4 of "IEEE P802.16m/D10 "Part 16: Air Interface for Broadband Wireless Access Systems: Advanced Air Interface." However, the wireless communication system of the present invention is not limited to the IEEE 802.16m-based system, and may be applied to various wireless communication systems such as a 3rd generation partnership project (3GPP) long term evolution (LTE).

Generally, the location update may be performed in paging group units in the idle mode. A mobile station may belong to one or more paging groups. If there is a call or data which is transmitted from an external network to the mobile station, the paging controller of each paging group performs paging. The paging controller transmits a paging message to all stations within the paging group, and each base station broadcasts a paging advertisement (PAG-ADV) message to the mobile station.

Figure 2:
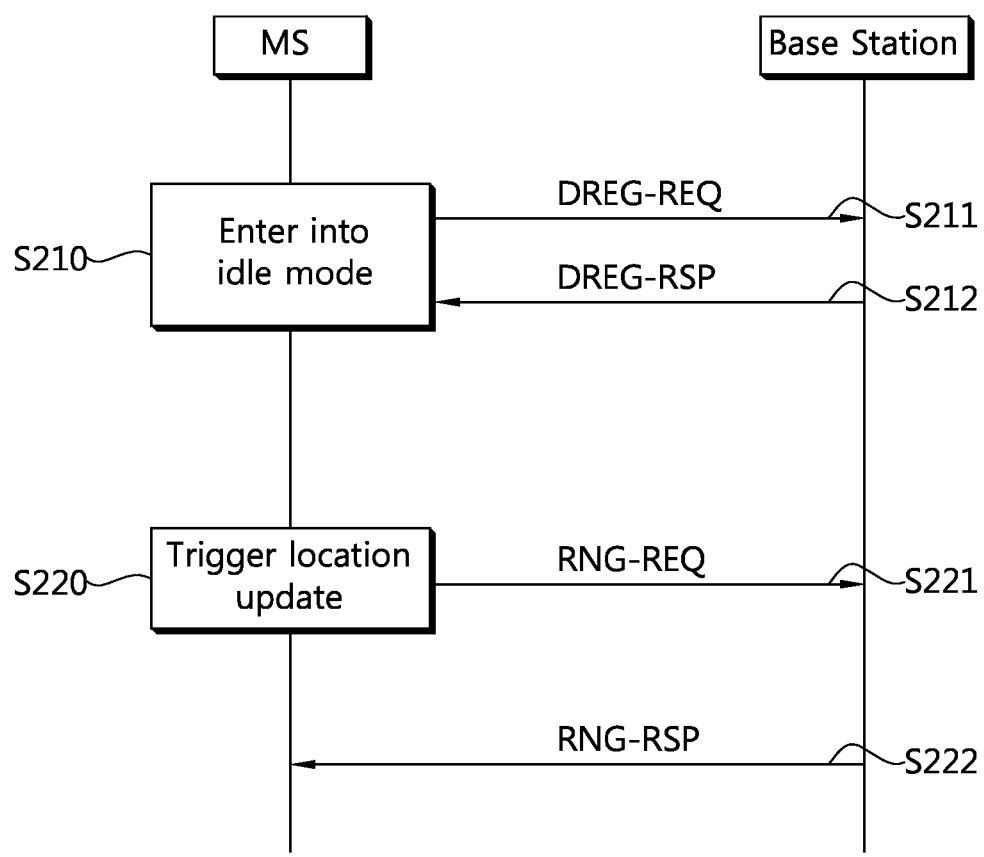
FIG. 2 is a flowchart illustrating a location update in IEEE P802.16m/D10.

FIG. 2 is a flowchart illustrating a location update in IEEE P802.16m/D10.

In operation S210, the mobile station (MS) enters an idle mode. Here, the MS may be an M2M device. The entrance to the idle mode is performed by exchange of a deregistration-request (DREG-REG) message and a deregistration-response (DREG-RSP) message between the mobile station and the base station.

In operation S220, the mobile station determines whether a location update triggering condition is satisfied at an idle mode (S220).

In operation S221, if the location update triggering condition is satisfied, the mobile station transmits a ranging-request (RNG-REQ) message to the base station. In operation S222, the base station transmits a ranging-response (RNG-RSP) message to the mobile station.

The location update triggering condition is described below.

(1) If it is recognized that the current base station does not support the currently allocated paging group, the mobile station performs a location update. The mobile station may detect whether the base station supports the paging group by monitoring a paging group ID which is transmitted by the base station.

(2) If the idle mode timer expires, the mobile station periodically performs a location update. When the location update is performed, the idle mode timer starts/restarts.

The mobile station performs the location update as part of a general power down process.

Hereinafter, an M2M group-based location update according to the present invention will be described.

The differences between the conventional location update and the present invention are described below.

First, the conventional location update does not consider paging of an MGID unit. Paging in paging group units is performed, but the usage of the paging group is different from the usage of the MGID which identifies the M2M multicast service flow.

Second, the existing location update is not based on the MGID, and thus the update of the MGID is not considered while performing the location update.

Figure 3:
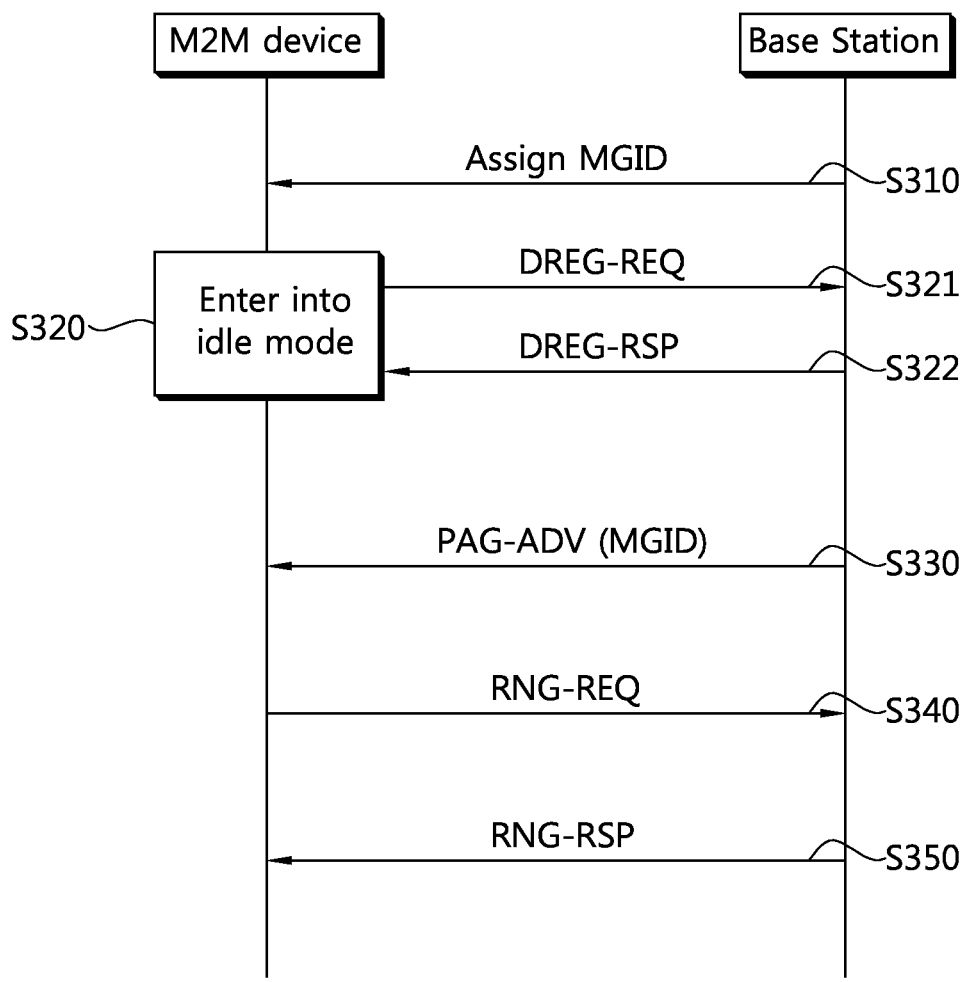
FIG. 3 is a flowchart illustrating an M2M communication according to an embodiment of the present invention.

FIG. 3 is a flowchart illustrating an M2M communication according to an embodiment of the present invention.

In operation S310, the base station allocates an MGID to the M2M device. The MGID may be allocated during the DSx process. As an example of a message for allocating MGID, a dynamic service addition-response (DSA-RSP), which is used in adding a service flow, may be used. The DSA-RSP may be transmitted by the base station in response to the M2M device's transmission of the DSA-REQ.

In detail, an example of the format of the DSA-RSP message is shown below.

TABLE 1

| Field name | Number of bits | Description |
| --- | --- | --- |
| MGID | 12 | Exists when this service flow is associated with an M2M multicast service flow. |
| M2M group area | 2 | Indicates the M2M group area to which the MGID belongs. |

In operation S320, the M2M device enters the idle mode. In order to enter the idle mode, in operation S321, the M2M device transmits a DREG-REQ message, which requests entrance to the idle mode, to the base station. In operation S322, the M2M device receives a DREQ-RSP message, which indicates the start of the idle mode, from the base station.

The DREQ-RSP message may include at least one of a paging cycle, a paging offset, and an FMDID.

In operation S330, in the idle mode, the M2M device receives a PAG-ADV message having an allocated MGID.

An example of the format of the PAG-ADV message is shown below.

TABLE 2

| Field name | Number of bits | Description |
|---|---|---|
| MGID | 12 | |
| M2M group area index | 2 | |
| Action code | 2 | 0b00: Perform network reentrance<br>0b01: Perform location update<br>0b10: Receive a multicast traffic without performing network reentrance |

The M2M device receives the PAG-ADV message having an action code which indicates performance of the location update and the M2M group are and/or the MGID allocated to the M2M device.

In operation S340, as the location update is triggered, the M2M device transmits a ranging-request (RNG-REQ) message, which indicates the location update at the idle mode, to the base station. The RNG-REQ message may include an indicator which indicates the location update at the idle mode.

In operation S350, the base station transmits the RNG-RSP message to the M2M device in response to the RNG-REQ. If the base station desires allocation of a new MGID, a new MGID may be included in the RNG-RSP message.

An example of the format of the RNG-RSP message is shown below.

TABLE 3

| Field name | Number of bits | Description |
|---|---|---|
| M2M group area index | 2 | |
| Current MGID | 12 | |
| New MGID | 12 | Exists when the current MGID is updated. |

Figure 4:
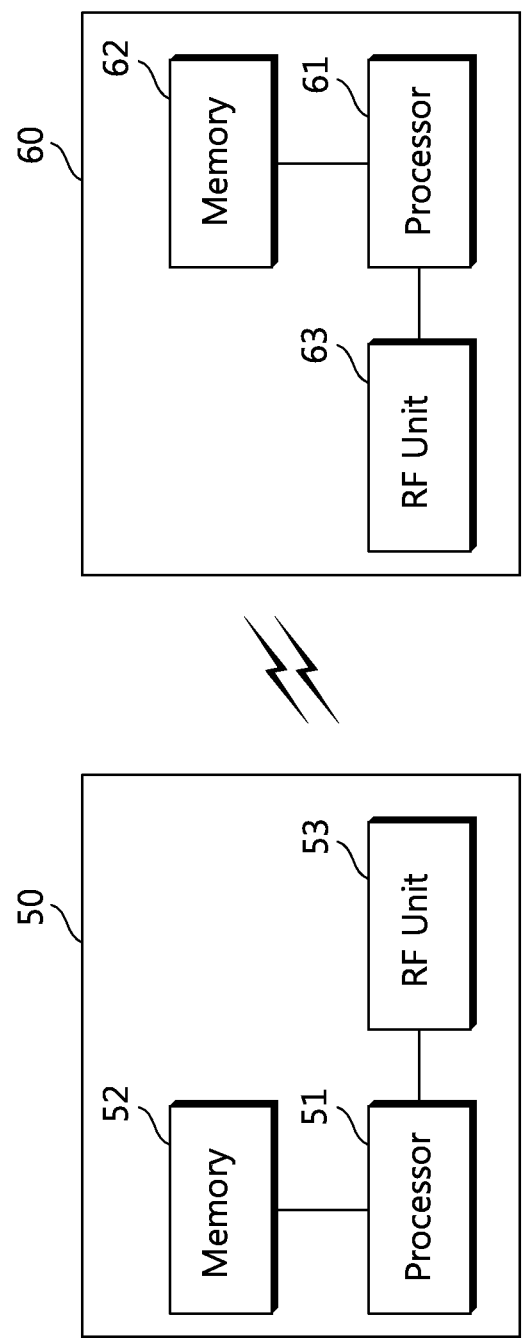
FIG. 4 is a block diagram illustrating a wireless communication system according to an embodiment of the present invention.

FIG. 4 is a block diagram illustrating a wireless communication system according to an embodiment of the present invention. The base station 50 includes a processor 51, a memory 52, and a radio frequency (RF) unit 53. The memory 52 is connected to the processor 51, and stores various information sets for operating the processor 51. The RF unit 53 is connected to the processor 51, and transmits and/or receives wireless signals. The processor 51 implements a suggested function, process, and/or method. In the embodiment of FIG. 3, the operation of the base station may be implemented by the processor 51.

The M2M device 60 includes a processor 61, a memory 62, and an RF unit 63. The memory 62 is connected to the processor 61 and stores various information sets for operating the processor 61. The RF unit 63 is connected to the processor 61 and transmits and/or receives wireless signals. The processor 61 implements a suggested function, process and/or method. In the embodiment of FIG. 3, the operation of the M2M device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for machine-to-machine (M2M) communication, comprising:
receiving, by a M2M device, a dynamic service addition (DSA) message from a base station, the DSA message including a M2M Group identifier (MGID) associated with a M2M multicast service;
entering, by the M2M device, an idle mode;
receiving, by the M2M device in the idle mode, a paging advertisement (PAG-ADV) message from the base station, the PAG-ADV message including the MGID and an action code indicating that the M2M device should perform a location update;
transmitting, by the M2M device, a ranging request (RNG-REQ) to the base station in order to perform the location update, and
receiving, by the M2M device, a ranging response (RNG-RSP) from the base station as a response to the RNG-REQ, the RNG-RSP including the MGID and a new MGID,
wherein each of the MGID and the new MGID is a 12 bit identifier that is used to identify the M2M multicast service which is shared by a group of the M2M device within a M2M group zone,
wherein the M2M device receives a M2M group zone index indicating the M2M group zone, and
wherein the M2M group zone included within at least one of the DSA message, the PAG-ADV message and the RNG-RSP.

2. The method of claim 1, wherein the DSA message further includes a M2M group zone index indicating the M2M group zone that the MGID belongs to.

3. The method of claim 2, wherein the PAG-ADV message further includes the M2M group zone index.

4. The method of claim 1, wherein the RNG-RSP further includes a M2M group zone index indicating the M2M group zone that the new MGID belongs to.

5. A device for machine-to-machine (M2M) communication, comprising:
a radio frequency unit configured to transmit a radio signal; and a processor operatively coupled with the radio frequency unit and configured to: receive a dynamic service addition (DSA) message from a base station, the DSA message including a M2M Group identifier (MGID) associated with a M2M multicast service;

enter an idle mode;

receive a paging advertisement (PAG-ADV) message from the base station, the PAG-ADV message including the MGID and an action code indicating that the M2M device should perform a location update; and instruct the radio frequency unit to transmit a ranging request (RNG-REQ) to the base station in order to perform the location update, and to receive a ranging response (RNG-RSP) from the base station as a response to the RNG-REQ, the RNG-RSP including the MGID and a new MGID, wherein each of the MGID and the new MGID is a 12 bit identifier that is used to identify the M2M multicast service which is shared by a group of the M2M device within a M2M group zone, wherein the M2M device receives a M2M group zone index indicating the M2M group zone, and wherein the M2M group zone is included within at least one of the DSA message, the PAG-ADV message and the RNG-RSP.

6. The device of claim 5, wherein the DSA message further includes a M2M group zone index indicating the M2M group zone that the MGID belongs to.

7. The device of claim 6, wherein the PAG-ADV message further includes the M2M group zone index.

8. The device of claim 5, wherein the RNG-RSP further includes a M2M group zone index indicating the M2M group zone that the new MGID belongs to.

9. A base station for machine-to-machine (M2M) communication, comprising:

a radio frequency unit configured to transmit a radio signal; and a processor operatively coupled with the radio frequency unit and configured to: instruct the radio frequency unit to transmit a dynamic service addition (DSA) message to a M2M device, the DSA message including a M2M Group identifier (MGID) associated with a M2M multicast service;

instruct the radio frequency unit to transmit a paging advertisement (PAG-ADV) message to the M2M device, the PAG-ADV message including the MGID and an action code indicating that the M2M device should perform a location update;

receive a ranging request (RNG-REQ) from the M2M device in order to perform the location update; and instruct the radio frequency unit to transmit a ranging response (RNG-RSP) to the M2M device as a response to the RNG-REQ, the RNG-RSP including the MGID and a new MGID, wherein each of the MGID and the new MGID is a 12 bit identifier that is used to identify the M2M multicast service which is shared by a group of the M2M device within a M2M group zone, wherein the base station transmits to the M2M device a M2M group zone index indicating the M2M group zone, and wherein the M2M group zone is included within at least one of the DSA message, the PAG-ADV message and the RNG-RSP.

* * * * *